July 20, 1943.   A. D. LUND   2,324,523
MACHINE FOR ASSEMBLING STORAGE BATTERY PLATES AND SEPARATORS
Filed Sept. 15, 1941   7 Sheets-Sheet 1

Fig.1

Inventor
ARTHUR D. LUND

July 20, 1943.  A. D. LUND  2,324,523
MACHINE FOR ASSEMBLING STORAGE BATTERY PLATES AND SEPARATORS
Filed Sept. 15, 1941  7 Sheets-Sheet 6

INVENTOR
ARTHUR D. LUND
BY
ATTORNEY

Patented July 20, 1943

2,324,523

UNITED STATES PATENT OFFICE 2,324,523

MACHINE FOR ASSEMBLING STORAGE
BATTERY PLATES AND SEPARATORS

Arthur D. Lund, Minneapolis, Minn., assignor to
Solar Corporation, Milwaukee, Wis., a corporation of Delaware Application September 15, 1941, Serial No. 410,881

11 Claims. (Cl. 29—84)

This invention relates to apparatus for assembling positive and negative plates and separators for storage batteries, and the primary object is to provide practical and efficient mechanism for positively engaging the plates and separators, located in separate supply stations, and then successively and accurately transferring them in predetermined order to receiving units where they are grouped in the same relative positions as they will occupy in completed batteries and will be accumulated until each of the respective assemblies has the desired number of component parts, depending upon the sizes of battery cells in which the groups are to be used.

Heretofore cell units or plate-separator assemblies have been formed principally if not entirely by manual manipulation, the operator selecting plates and separators from separate stacks and grouping them as required, and in other instances the plates are fixed in their proper spaced relationship by being "burned" to the terminal post connecting straps, and the operator then completes the unit by inserting the necessary separators edgewise in the spaces between plates.

Such and other manual methods of grouping plates and separators for final battery use are objectionable for several reasons, of which may be mentioned the comparatively long time required, the undependability and inaccuracy of hand methods, and, finally, the relatively greater expense involved.

In addition to the general objectives, first above set forth, the invention includes numerous and more detailed objects and advantages, all of which will be fully set forth in this description, reference being made to the accompanying drawings, in which like characters will be employed to designate like parts throughout the several views, and in which.

Before proceeding with a detailed description of the various machine parts a few observations will be made concerning the prerequisite functions and necessary operations of the machine with reference to the accomplishment of the desired results.

Figure 28:
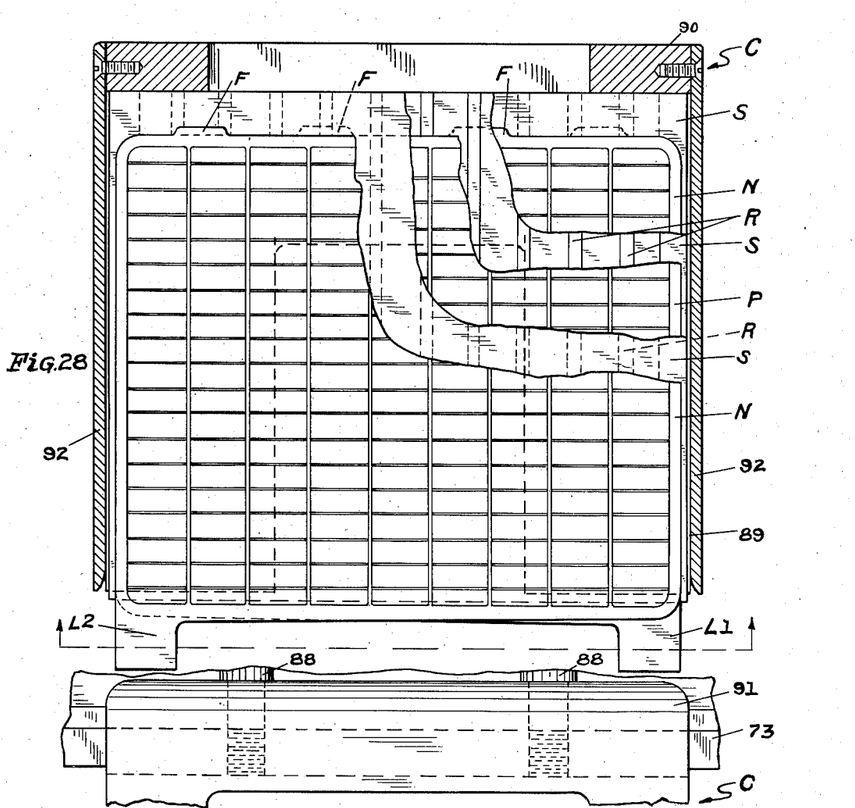
Fig. 28 is an enlarged detail plan view illustrating the relative positions of plates and separators assembled on one of the receiving shelves and as they will ultimately be conveyed therefrom for further processing as a unit, this view showing parts of the shelf unit in section as on lines 28—28 in Figs. 20 and 29.
Figure 29:
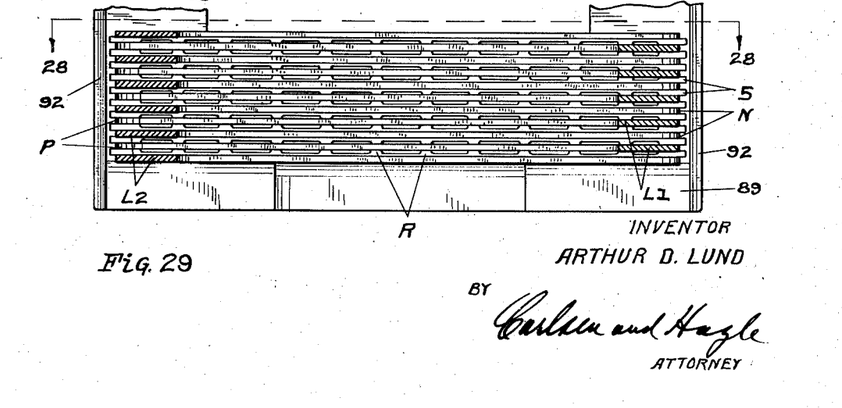
Fig. 29 is a sectional elevation on line 29—29 in Fig. 28.

As is well known a storage battery cell plate assembly comprises a series of positive and negative plates alternately arranged in series, and with each two adjacent plates being separated by a plate or sheet of wood, fiber or other suitable material known as a separator. It is also common practice, in order to provide space for circulation of the electrolyte, to provide the positive plate side of each separator with spaced parallel ribs extending vertically, thus leaving most of the positive grid plate exposed to the fluid; while the opposite face of the separator is not so ribbed, it preferably having full face contact with the adjacent negative plate. This is illustrated in Figs. 28 and 29, wherein the plate assembly includes positive grid plates P, negative grid plates N, and the separators S, such separators having ribs R on the positive sides only, and under which circumstances it will be seen that each two separators will have their face surfaces reversed although otherwise identical in form and size.

The positive plates P are provided with lugs L1 at one side of the group, subsequently to be connected by the strap of a terminal post (not shown); and, at the other side similar lugs L2 extend from the negative plates N. The grid plates are also provided, at their bottom edges, with short lugs or feet F designed to rest on ribs conventionally formed in the battery case. It is here only necessary to note that the feet of the negative plates are offset from those of the positive plates (see Fig. 28), thereby forming spaces between the respective rows of feet, a condition utilized in the operation of the machine as will subsequently be described.

It may here further be noted that the height length of the separators S is greater than that of the main body portions of the grid plates P and N so that in the completed assembly, and with all plates resting on the battery casing ribs, the separators extend above the upper edges of the grid plates, which is a desired condition. When here assembling the various plate elements, however, the separators are positioned with marginal portions extending beyond what later becomes the lower edges of the grid plates, as shown at the upper part of Fig. 28, and are removed from the receiving shelves in this condition. The reason for this is to space the separators away from the lugs L1 and L2 until such lugs have been "burned" or fused with the respective terminal straps, whereupon the separators can be pushed up into final operative position by merely resting the plate assembly on a flat support, or inserting it in the battery.

Figures 2, 6, 7:
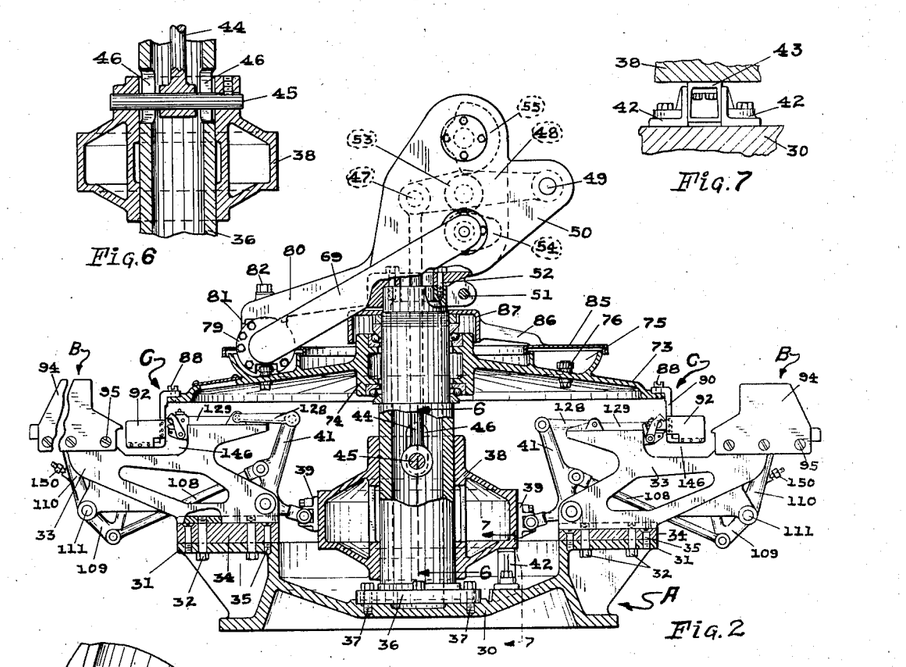
Fig. 2 is a sectional elevation taken generally diametrically through the machine with some parts in full and others broken away to facilitate explanation.
Fig. 6 is a sectional detail elevation on line 6—6 in Fig. 2.
Fig. 7 is a detail elevation, partly in section, on line 7—7 in Fig. 2.

Referring now to the machine proper A designates a heavy cast base having a dished central portion 30 and an outer, annular ledge or circular rim 31 (Fig. 2). Rigidly secured by bolts 32 to the ledge 31 is a series of circumferentially spaced, radially disposed frames 33, the outer ends of which support supply stations for the grid plates and separators, and these frames also carry the plate transfer mechanisms. As will presently be described it is necessary that the transfer mechanisms operate at successively graduated levels, and in order to utilize otherwise identical frames they are separated from the horizontal ledge 31 by spacer blocks 34 of different thicknesses. Two of such blocks are shown in Fig. 2, and may be independently secured to the base rim 31, by screws 35.

Figure 12:
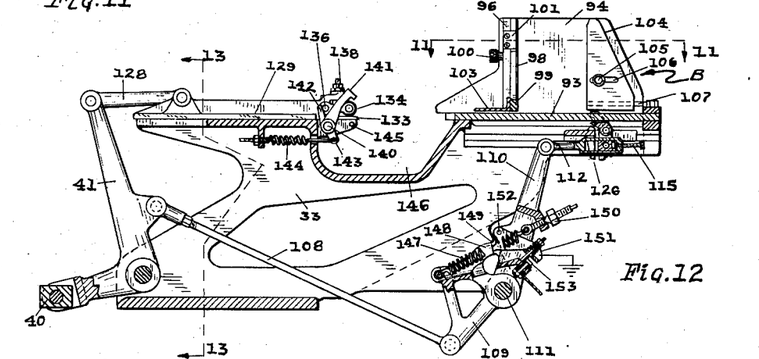
Fig. 12 is a sectional elevation on line 12—12 in Fig. 11.

The base A centrally supports a heavy tubular standard 36, rigidly secured to the base portion 30 by bolts 37. Upon this standard is slidably mounted an annular frame or hub 38, to the peripheral surface of which is secured a circumferentially spaced series of bearing brackets 39, each of which has a horizontal recess in which operates a bearing block 40 (Fig. 12) pivoted in one arm of a bell-crank lever 41 which operates the plate transfer mechanism subsequently to be described. It will be noted, with particular reference to Fig. 2, that the bearing brackets 39, there shown, are secured at different elevations, corresponding to the respective elevations of the associated frames 33, and this is of course also true with respect to the brackets and frames not shown, which as explained are arranged at progressively graduated levels around the entire machine.

While the frame 38 is free to reciprocate vertically, in order to simultaneously actuate all of the plate feed mechanisms, it cannot rotate or oscillate about the standard due to the device shown in Fig. 7 which comprises a pair of spaced guide members 42, secured to base A, forming a guide way for block 43, secured to the hub 38.

The hub 38 is reciprocated vertically through the action of a connecting rod 44 the lower end of which engages a pin 45 extending diametrically through the standard 36 and through vertical slots 46 in the side walls thereof to anchor in opposite sides of the hub as clearly demonstrated in Figs. 2 and 6.

At its upper end the connecting rod 44 is pivoted, by pin 47, to one end of a lever 48 the opposite end of which is fulcrumed at 49 to and within a housing 50, of irregular form and rigidly secured upon the top end of the standard 36 by clamp bolt 51 and stud bolts 52.

Figures 9, 10:
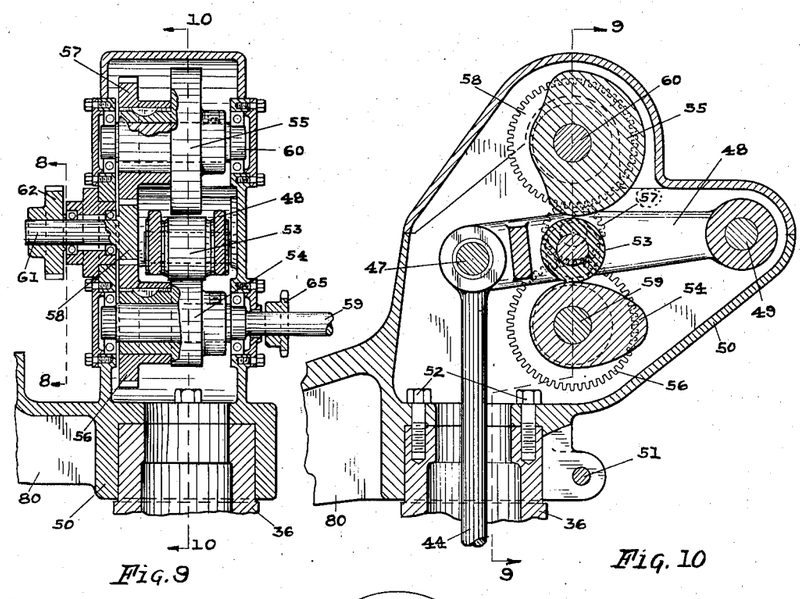
Fig. 9 is a sectional elevation through the power transmission, as seen on line 9—9 in Fig. 10.
Fig. 10 is a sectional elevation on line 10—10 in Fig. 9.
Figure 11:
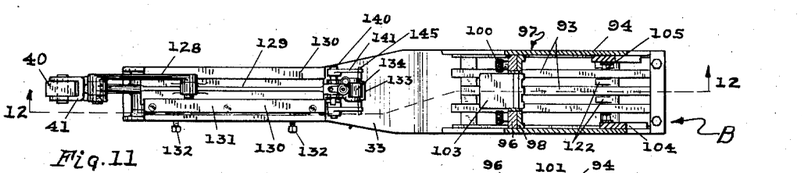
Fig. 11 is a detail plan view of one of the supply stations and stripper assembly or feed mechanism, partly in section as on line 11—11 in Fig. 12.

The lever 48 is composed of two rigidly connected side parts between which is rotatably mounted a roller 53 (Figs. 9 and 10). A cam 54 operates under the roller to lift parts 48, 44 and 38, while an oppositely acting cam 55 actuates the roller 53 downwardly to produce a positive restoring motion to the same parts.

Figure 8:
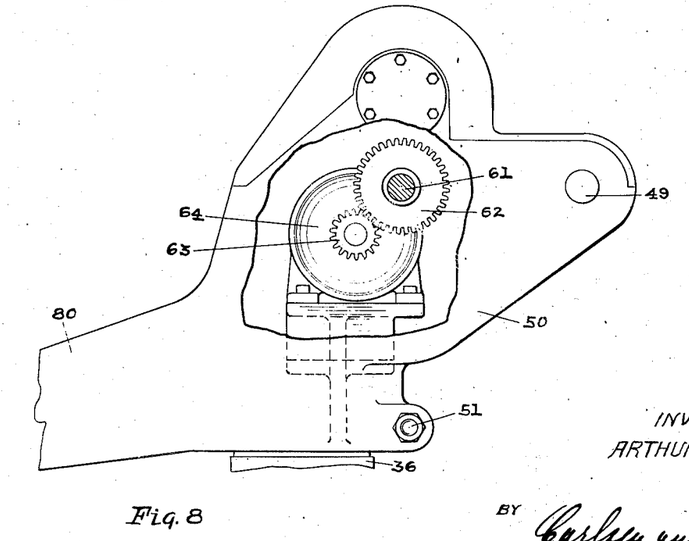
Fig. 8 is an enlarged detail elevation of the power transmission unit shown in Figs. 1 and 2, with a part of the housing and internal mechanism broken away to show other parts as would be seen on section line 8—8 in Fig. 9.

The cams are synchronously driven through gears 56 and 57 and an intermediate pinion 58. The gears 56 and 57 are preferably keyed on extended hubs of the respective gears 54 and 55, and such hubs then fixed on suitably journaled lower and upper shafts 59 and 60, while the pinion 58 has an integral shaft 61 journaled in the adjacent housing wall and extending exteriorly thereof to support a spur gear 62. This gear 62 meshes with the driving pinion 63 (Figs. 1 and 8) of a motor 64 mounted on a suitable extension of housing casting 60.

Figures 3, 4:
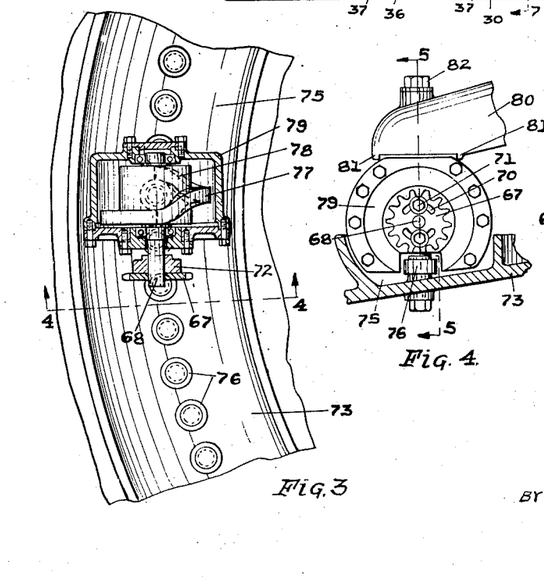
Fig. 3 is an enlarged detail view of the intermittent turret actuating mechanism, with certain parts in section.
Fig. 4 is a detail elevation, partly in section, as on line 4—4 in Fig. 3.

Shaft 59 may extend a considerable distance from the housing 50 to operate conveyors or other auxiliary mechanisms (not shown), but immediately adjacent the housing is provided with a sprocket pinion 65 (Fig. 9) which operates through a sprocket chain 66 to drive a pinion 67 on a shaft 68, the sprocket pinions and chain being enclosed by a housing 69. It will be noted, with particular reference to Figs. 4 and 5, that the pinion 67 is not secured directly on shaft 68 but has arcuate slots 70 through which stud bolts 71 extend to adjustably secure the pinion to a block 72, fixed on the shaft. The purpose of this arrangement is to permit of such adjustments as may be necessary to synchronize intermittent actuation of the magazine supported turret with the plate feeding mechanisms.

The turret referred to is a round cast plate 73 having a hub 74 mounted, with suitable antifriction bearings (Fig. 2) to rotate about and be supported on the standard 36. The plate is provided with radially spaced flanges forming an annular channel 75 in which is arranged a circumferentially spaced series of roller studs 76. These studs are engaged by a flange 77 extending from the cylindrical surface of a hub member 78 on shaft 68, the flange being of such width as to pass snugly between two adjacent rollers. One half of the length of the flange lies in a plane perpendicular to the axis of shaft 68 with a result that during contact of this portion of the flange with the studs 76 there will be no movement of the turret, in fact this flange portion locks the turret against rotation. The other half of the flange, however, is spiraled about its portion of hub 78 with a result that when it makes a complete half-revolution contact with the studs 76 it will rotate or advance the turret sufficiently to move each plate receiving holder from one supply station to another where it will remain until a plate is transferred, whereupon another complete rotation of shaft will advance the turret another step.

Figure 1:
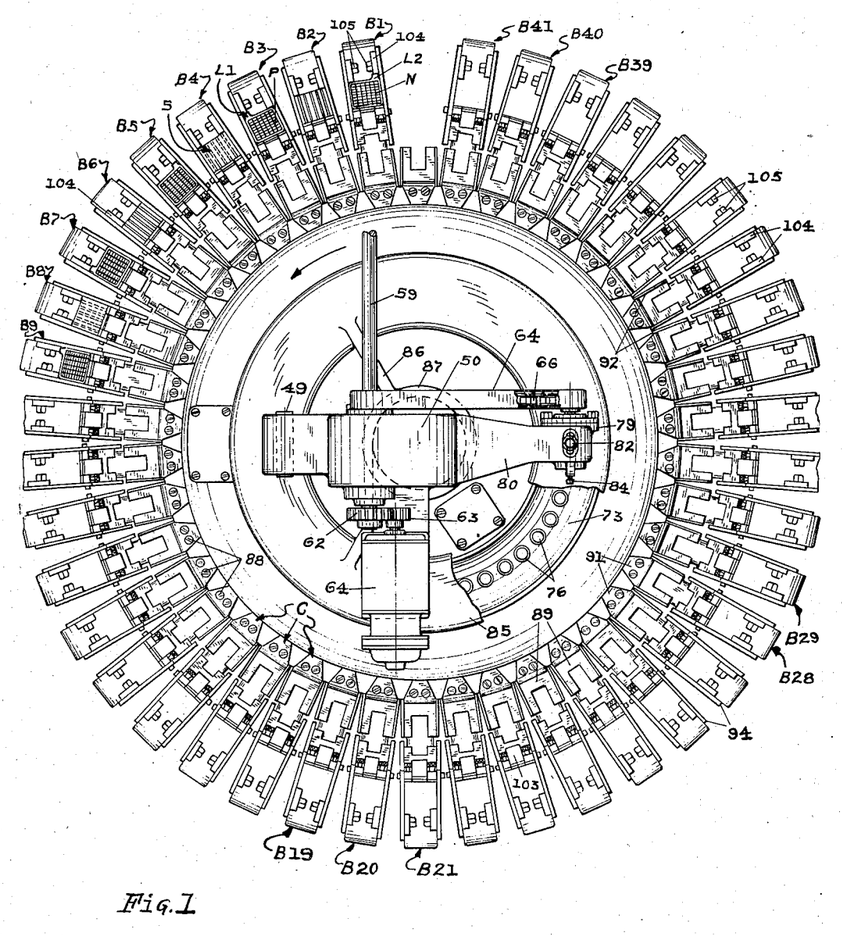
Fig. 1 is a plan view of a machine embodying the principles of the invention, with fractional portions broken away for convenience in illustration.
Figure 5:
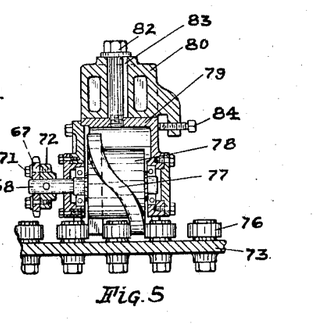
Fig. 5 is a sectional elevation on line 5—5 in Fig. 4.

The shaft 68 and its hub 78 are journaled in a housing 79 which is adjustably attached to an arm extension 80 of housing 50. This connection comprises a pair of parallel flanges 81 which depend integrally from housing arm 80 to form an inverted shallow guide channel for the upper end of housing 79. The housing parts are rigidly secured together by a bolt 82 which extends through a slot 83 (in 80, Fig. 5), so that when the bolt is loosened the case 79 may be adjusted transversely with respect to arm 80. In order that this adjustment may be accurately made, to correctly align receiving shelves and supply stations, I provide an adjuster screw 84, as shown in Figs. 1 and 5. It will be understood that any adjustments so made will never be so great as to operatively disalign sprocket pinions 67 and 65.

To prevent the possibility of foreign matter dropping into the channel 75, which preferably contains oil to lubricate the rollers 76 and cam 77, I provide a circular cover plate 85 over the channel. As this plate cannot rotate with the turret, because of the position of unit 79, it is slightly spaced above the channel forming flanges (Fig. 2) and is carried by arms 86 extending radially outwardly from a supporting ring 87 removably mounted on the standard 36.

The plate collecting shelves or units, designated generally by the letter C, are attached to the peripheral edge portion of the turret plate 73 as by screws 88, and are designed as follows. Each unit is formed of heavy plate material into a horizontal shelf part 89, which continues from its rear or inner edge in a vertical back wall 90 that terminates at its upper edge in a mounting flange 91 to receive the screws 88. The parts 89 and 90 are generally U-shaped, the cut out central portions being provided to permit the movement therethrough of certain parts of the plate transfer mechanisms; and these parts, 89 and 90, are laterally connected by side wall plates 92, to insure proper retention of the plates in the holders until the completed plate assemblies have been removed.

Mounted upon the outer ends of the frames 33 are the supply stations or plate magazines B1, B2, B3, B4, B5, etc., all of substantially the same construction except that slight adjustments are made to accommodate different size of plates and to properly retain the plates depending upon whether they are separators, or positive or negative grids. The number of stations in the present instance determines the maximum number of plates for a complete plate assembly, the machine being preferably designed to group plates for one of the larger size batteries, but where smaller plate groups are to be assembled then a lesser number of stations are supplied and the others remain idle. In a broader aspect the invention also contemplates the possibility of arranging the stations in a non-circular path and also of using comparatively few stations but taking more than one plate from each station for each assembly as here illustrated.

In the present arrangement, and for purpose of illustration, the first station, B1, contains a stack of negative plates N, the lugs L2 thereof being disposed at the right, as seen in Fig. 1. The second station, B2, holds a stack of separators S with the ribbed faces thereof all turned up. Station B3 then holds a stack of positive plates, P, the lugs L1 all being on the left. Station B4, next in sequence, then contains a stack of separators S, with the ribbed faces all turned down. The next series of stations, B5, B6, B7, and B8 merely duplicate the arrangement described for stations B1—B4, and thereafter the stated sequence is repeated all the way around the machine. As the plates are successively transferred from the stations to the holders C it will thus be seen that they will accumulate in the holders in the correct order and arrangement which they will properly assume in the completed battery. As the plates are transferred from the bottoms of each supply station stack to the assembly shelves they will of course build up in the holders, gradually increasing the heights of the piles therein, and it is for this reason, and because the holders C always operate at the same elevation, that it is necessary to successively elevate the frames 33, by the blocks 34, previously described.

The stations B proper each consists of a series of spaced bars 93 forming a bottom support for the stack of plates to be held, these bars being suitably supported at their inner and outer ends and having smooth upper surfaces upon which the plates may slide when stripped from the under side of the stack. The stacks are laterally restrained by side wall plates 94 secured to frame 33 as at 95. Upon their opposed faces and near their inner ends the plates 94 have vertical bars 96 which carry a guide gate 97 composed of side bars 98 and a bottom cross bar 99. The gate is secured in place by set screws 100, which, when loosened, permit vertical adjustments of the gate within the limits determined by keys 101 secured to bars 96 and extending into recesses 102 in the gate bars 98. The purpose of such adjustments is to regulate the size of opening between the bar 99 and bars 93 as required to accommodate grid plates and separators of different thicknesses such as used in different types of batteries. It will also be noted that the gate bar 99 carries a flat shoe 103, extending forwardly thereof and has for its purpose to hold the stripped plate or separator down until engaged by a gripping device which completes the transfer operation. This shoe will, of course, also be vertically regulated with adjustments to the gate. It will thus be seen that the gate 97 acts as a restraining and positioning member at the inner or forward face of the plate stack, and also operates to restrict the removal of plates from the bottom of the stack to one at a time.

To hold the stack in forward position against the gate 97 I provide the side walls 94 with separate guide brackets 104 which engage the outer end edges of the stacked plates. These brackets are adjustably secured by bolts 105 passing through horizontal slots 106, and guide keys 107 insure retention of the brackets in proper vertical positions. The slots 106 are sufficiently long to permit substantial horizontal adjustments of the brackets, and are also separately adjustable in each station so that when necessary, as indicated with stations B1, B3, and B5, one bracket may have normal guiding contact with one edge of the plate proper while the other is moved out to guide against the plate lugs L1 or L2.

The plate transferring mechanism will now be described and includes the primary actuating lever 41, which, as previously noted, is intermittently oscillated through action of the hub 38, rod 44 and power driven cam devices in housing 50.

The stripper device is actuated by the lever 41 through a connecting rod 108 the lower and outer end of which attaches to the depending arm 109 of a lever having an upper arm 110, and is fulcrumed to frame 33 at 111. The arms 109 and 110 normally oscillate together as a single unit, but may be relatively moved in connection with an overload safety shut-off device presently to be described.

At its upper end the lever arm 110 connects with a link member 112 having a longitudinal guide slot 113 in which is slidably secured a bearing block 114. Adjustment of the block 114 in slot 113, to accommodate different height lengths of plates and separators, is effected by a set screw 115 which is threaded in one end of the link and has a head 116 rotatably secured in a recess in the block.

Figure 18:
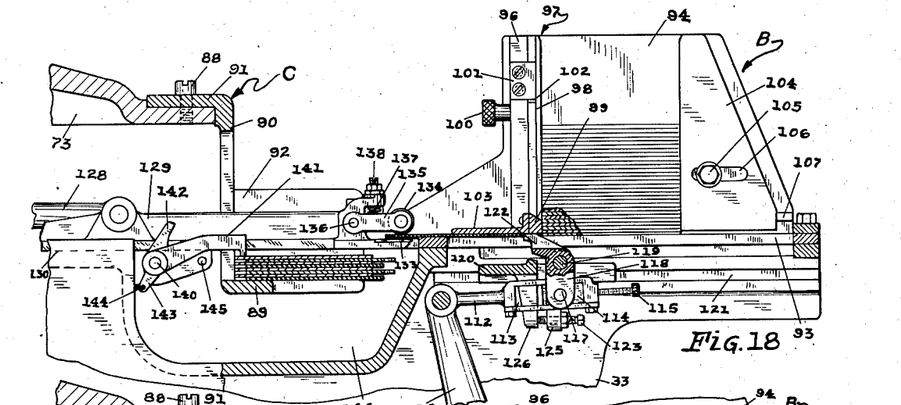
Fig. 18 is an enlarged sectional elevation through a portion of one of the plate feeder devices, mounted in the machine, with grid plates in initial and final positions and with one plate in an intermediate position being transferred.
Figure 19:
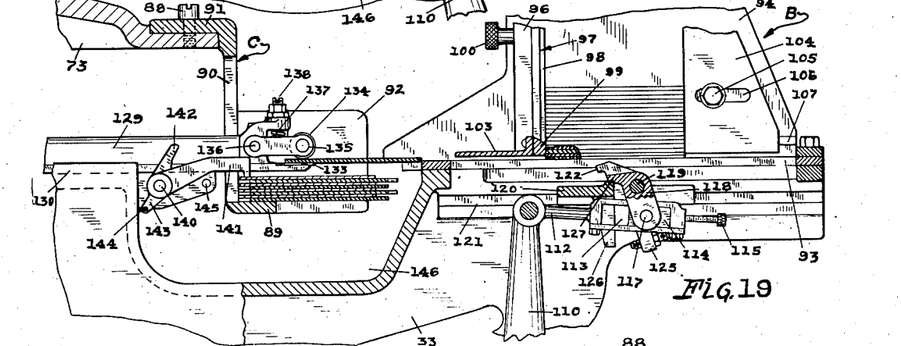
Fig. 19 is an elevation similar to Fig. 18 but showing various parts in different positions, the transferred plate approaching its final position, while the stripper dog is returning to the supply station for another plate.
Figure 20:
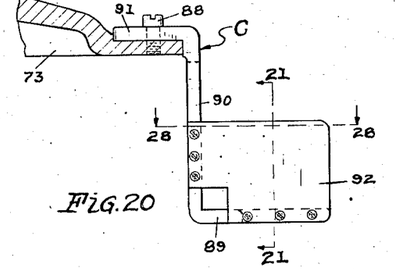
Fig. 20 is a side elevation of one of the plate receiving shelves, illustrating construction details thereof.
Figure 21:
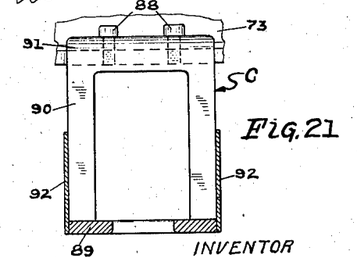
Fig. 21 is a sectional elevation on line 21—21 in Fig. 20.

The block 114 serves as a bearing for a pin 117 of a dog lever 118 which is fulcrumed at 119 in a stripper carriage 120 which is slidably secured in lateral guide-ways 121 in the frame (33) walls below the supply station. The member 118 has a series of fingers 122 which travel between the spaced bars 93 and are arranged to extend slightly thereabove, as shown in Figs. 18, 22, 26 and 27, when moved forwardly to engage the lowermost plate of the stack and by so-called stripping action advance it inwardly toward the shelf support A, as best shown in Fig. 18. The maximum elevation of the fingers 122 is determined and adjusted by a stop screw 123, having a lock nut 124, the screw being threaded in and extending through a lower arm 125 of the lever 118 to stop against a depending leg 126 of the carriage 120. When the lever arm 110 moves outwardly, to return the stripper unit to plate engaging position the arrangement of pivots and resistance of the carriage 120 is such as to cause the fingers 122 to drop sufficiently to pass under the plate stack, as shown in Fig. 19, the lever 118 in this event resting on the abutment 127 of carriage 120.

As a stripped plate is moved by the fingers 122 into the position shown in Fig. 18 it is engaged by a reciprocating gripper mechanism which completes the delivery of the plate to the receiving shelf A disposed in radial alignment with the supply station. This mechanism will now be described.

At its upper extremity the vertical arm of the bell-crank lever 41 is connected by a link 128 to a carriage 129, the side edge portions of which slidably guide in opposed channels 130 formed in the inner end portion of frame 33, this carriage operating on substantially the same level as bars 93. One of the channels is preferably defined by a removable strip 131 which is adjustable by screws 132 to take up wear.

Figures 13, 14, 15, 16, 17:
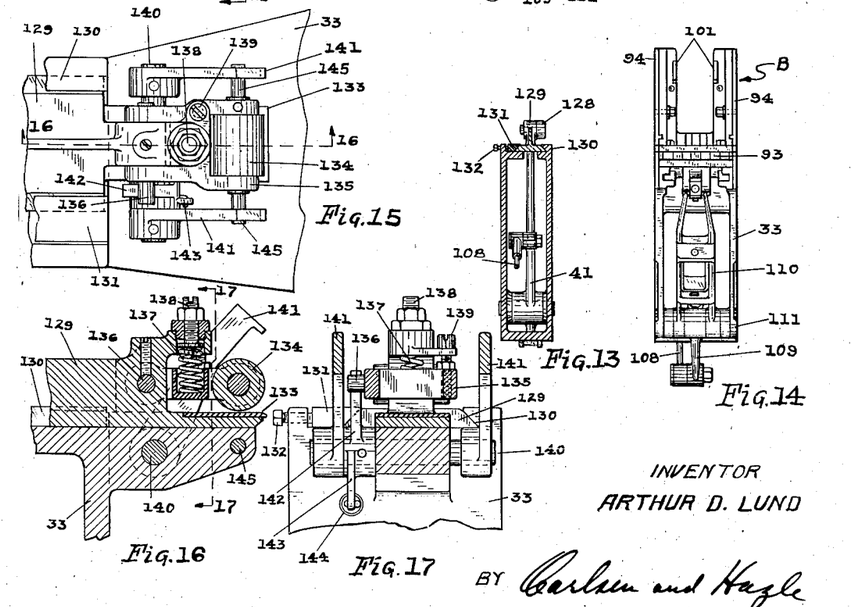
Fig. 13 is a cross section elevation on line 13—13 in Fig. 12.
Fig. 14 is an outer end elevation of a stripper unit, as seen from the right in Fig. 12, and with certain parts removed.
Fig. 15 is an enlarged detail view of a portion of the feeder mechanism, as seen on smaller scale at the central part of Fig. 11.
Fig. 16 is a sectional elevation on line 16—16 in Fig. 15.
Fig. 17 is a cross section elevation on line 17—17 in Fig. 16.

The outer end of carriage 129 has a receiving plate 133, for engagement directly under the leading edge portion of the grid or separator plate delivered by the stripper, as best shown in Fig. 18; and cooperating with the plate 133 to form a grip therewith is a roller 134 mounted in one end of a link 135 which is attached to the carriage 129 as by pin 136. A spring 135 is arranged to create down pressure on the roller 134, and the tension of the spring can be regulated as at 138. Downward movement of the roller link 135 is checked by an adjustable stop screw 139 (Fig. 17), which is threaded into link 135 with its head having stopping contact with an extension arm of part 129.

The stripping and transferring mechanisms thus far described are common to all of the station assemblies, whether containing grid plates or separator plates. In the units containing grid plate stacks, however, an additional mechanism is added to slightly change the operation. One of such mechanisms is illustrated in Figs. 11, 12, 15, 16, 17, 18 and 19, and may be described as follows.

Fulcrumed to the frame 33 is a multiple-armed lever frame including a fulcrum pin 140, a pair of laterally disposed stop arms 141, a lift arm 142, and a pressure arm 143 adjustably connected to the frame 33 by a tension spring 144 which operates to yieldingly hold the stop arms 141 down. It will be noted that the previously described pin 136 is extended at one end so that as it is moved rearwardly it will engage and tilt the arm 142 and thus raise the stop arms 141, as indicated in Figs. 12, 15, 16 and 17. It will also be seen that when the stop arms 141 are not down in engagement with a plate group in a holder C (as in Figs. 18–19) the downward movement of such arms is limited by the ends of a pin 145 fixed in an adjacent part of the frame 33.

The purpose of the stop arms 141 is to stop the movement of the grid plates before they reach the bars 90 of shelf frame C, so that they will not project in as far as will the separator plates, the transfer mechanisms of which do not have the devices 140–145; and the reason for hinging and operating the lever frame 141–142–143 in the manner indicated is to permit the arms 141 to be swung well back, when released from the plate assembly, so that the receiving holders C can move freely through the circular arrangement of frame openings 146.

In the operation of any battery plate handling machinery it is found that an oversize, distorted, or otherwise irregular plate will occasionally find its way into the machine, causing jamming; and to provide against possible breakage of parts I have designed an automatic safety mechanism which will not only shut off the power to the machine but will accurately indicate just where the jam has occurred. In explaining this mechanism particular reference is made to Figs. 12 and 26.

Figures 22, 23, 24, 25, 26, 27:
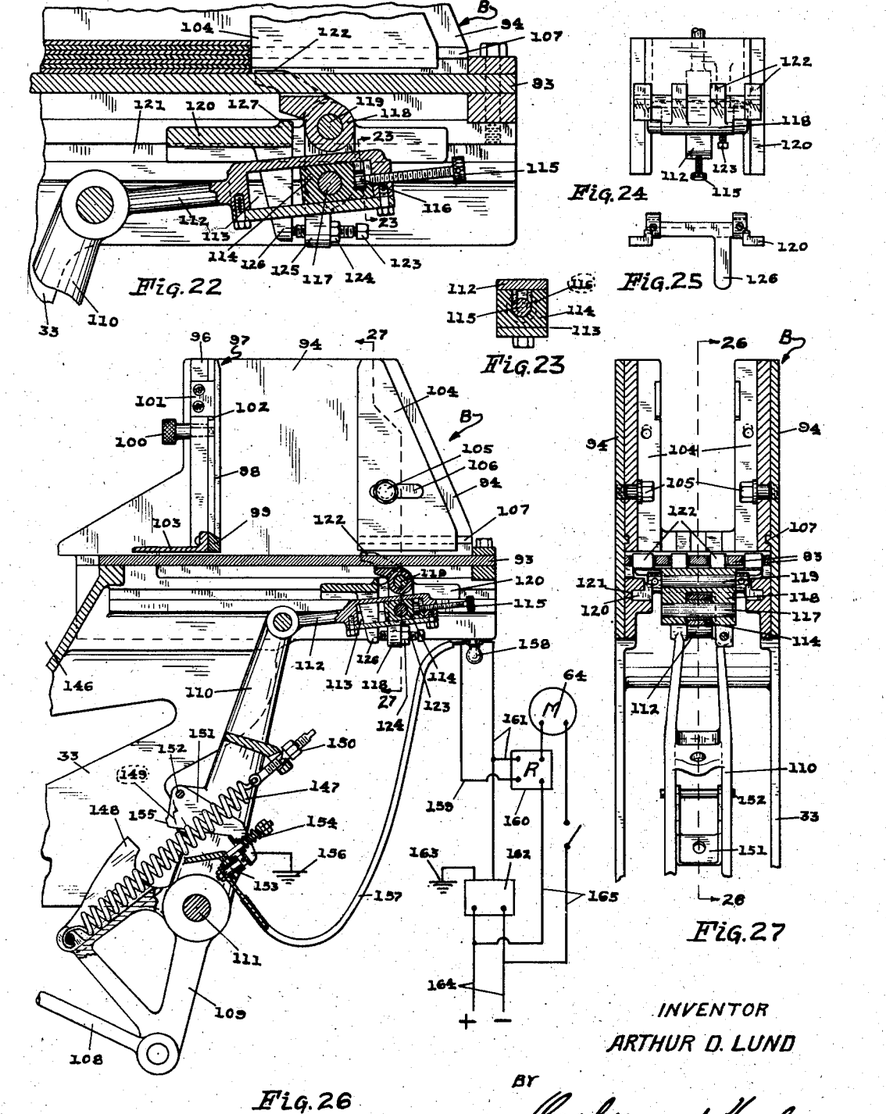
Fig. 22 is an enlarged detail section taken longitudinally through a portion of the plate stripping device showing the stripper dog and associated parts as they appear just before the lowermost plate of the supply stack is to be engaged.
Fig. 23 is a sectional detail on line 23—23 in Fig. 22.
Fig. 24 is a detail plan view of the plate engaging stripper dog and its support, removed from the machine.
Fig. 25 is an end view of the aforementioned stripper dog support or frame.
Fig. 26 is a sectional elevation, on line 26—26 in Fig. 27, through various parts of the stripper and plate feed mechanism, this illustration also showing an automatic safety mechanism and its associated circuits.
Fig. 27 is an elevation, partly in section on line 27—27 in Fig. 26, but with some parts removed.

As previously mentioned lever arms 109 and 110 normally oscillate about pivot 111 as a single unit. This is due to the fact that a heavy tension spring 147 tends to yieldingly hold a rigid extension 148 of arm 109 in contact with an abutment 149 of arm 110. The tension of spring 147 may be regulated at 150. When a jam now occurs in the stripper mechanism, preventing normal operation thereof, the arm 110 will not be positively actuated to the left (as shown in Fig. 26) but can remain stationary while the lower arm continues its movement, in a right hand direction, under the action of rod 108. This will result in separating the parts 148—149, but, it may be noted, such action will not effectively increase the spring tension because as the gap between parts 148—149 increases the spring will approach a dead center position with respect to lever fulcrum 111.

The overload release further inclues a signal circuit and electric motor control comprising a switch lever 151 pivoted to lever arm 110, as at 152. This lever is arranged to make contact with an insulated screw 153 rigidly secured with respect to arm 110, and a spring 154 tends to close and maintain the contact. Such contact is normally prevented, however, by reason of the fact that the contact lever has an abutment 155 which stops against arm extension 148, and when that extension is in its usual operating contact with abutment 148 it also engages the abutment 155 to break contact at 151 and 153.

The circuit arrangement diagrammatically illustrated shows the contact lever 151 grounded at 156, while contact screw 153 has wire connection 157 to one side of a signal light 158, and has an extension 159 connected to a relay 160. The other pole of the relay is connected by wire 161 to light bulb 158 and to a transformer 162 grounded at 163. Transformer supply wires 164 also supply the circuit 165 to motor 64, such circuit including the normally closed relay 160. When contact is now made between elements 151 and 153, under the contingency above described, the circuits will be closed to light the signal 158 and to energize the relay 160 to break the main motor circuit 165. This will in turn idle the entire machine while the signal 158, of which there is one for each supply station B, will remain energized so that the operator can quickly locate the trouble. When the difficulty has been corrected so that lever arms 109 and 110 can be restored to their relative positions then the signal will be deenergized and all parts are in condition to resume operation.

The general operation of the entire machine, while probably obvious from the foregoing description may be summarized as follows:

At the outset all of the receiving shelves or collecting supports C are preferably empty, and with the machine idle the magazines or supply stations B1, B2, B3, etc., are stocked with positive grid plates, negative grid plates, and separator plates in the order indicated in Fig. 1. The number of magazines so stocked will depend entirely upon the size of battery for which the plate group assemblies are to be used. As it is necessary to have negative grid plates at both ends of the plate groups it will be necessary to make some manual adjustment in sequence, and this may be done either by initially adding or removing plates from certain holders. Thus the first plates transferred from stations B2, B3 and B4, and B6, B7, and B8, to the adjacent holders C may be removed, so that each plate assembly shelf will start fresh from a station such as B1, B5, and B9, or, in the alternative, the intermediate holders B2, B3, etc., may be manually started with negative plates, separators, etc., so that all holders will have stacks bottomed on negative plates.

In any event when the initial plate adjustments are thus made the motor circuit is closed, whereupon, each transfer mechanism is actuated to transfer one plate or one separator to its adjacent holder. In other words, each stripper mechanism ejects the lowermost plate from its supply station and advances it inwardly until it is engaged by the associated gripper device 133–134, which then continues the transfer action until the plate contacts the stop arms 141, whereupon the gripper continues its movement and thus releases the plate so that it may drop down into the holder C. Where separator plates are being transferred no stop dogs 141 are present, with a result that such plates are not released until they contact the rear wall bars 90, thereby offsetting them with respect to the grid plates as shown in Figs. 18, 19, and 28, with the advantage above set forth.

After a plate has thus been transferred from each supply station to its adjacent holder, and the stop levers 141 have been raised (Figs. 2, 12 and 16) to give clearance to the holders C, the cam 77 goes into action to rotate the turret 73 one step, thus advancing each holder to the next station, whereupon the transfer operation again takes place, and the process is continued until each holder has a complete plate group assembly.

When the filled holders reach the vacant space shown at the top of Fig. 1, the complete plate assembly is removed therefrom by hand or by a conveyor mechanism (not shown) preferably actuated by the power take off shaft 59.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A battery plate assembling machine comprising a series of magazines for respectively containing supplies of positive grid plates, negative grid plates, and separator plates, a series of holders, a continuously operating element for effecting step-by-step movements of one of said series relative to the other series to sequentially place the magazines and holders in registry for transfer of the plates from the magazines to the holders, and means for successively projecting the plates from the magazines towards the respective holders and means for transferring the projected plates to the holders in the order in which such positive, negative, and separator plates occur in a battery.

2. In a battery plate grouping machine, separate means for supporting separate supplies of positive grid plates, negative grid plates, and separator plates, a plate receiving device, a continuously operating element for effecting step-by-step movements of the plate-receiving device to sequentially place the same in registry with the separate plate supporting means, means for projecting the plates towards the receiving device and means for transferring the projected plates to the plate supporting means so that the positive grid plates will be alternated with negative grid plates and one separator plate will be placed between each two adjacent grid plates, and with the separator plates of each adjacent pair having their corresponding face surfaces reversed with respect to each other.

3. A battery plate assembling machine comprising a series of magazines for respectively containing supplies of positive grid plates, negative grid plates, and separator plates, a plate accumulating device movable progressively from one magazine to another so as to receive plates therefrom in the sequence in which said positive, negative and separator plates occur in a battery, a cam element cooperating with the plate accumulating device and fashioned to effect the progressive movement and to hold the device at rest when registering with a magazine, means to effect projection of the plates from the magazines towards the accumulating device and means for transferring the projected plates to the accumulating device.

4. A battery plate assembling machine, comprising a series of stations adapted to respectively contain stacks of grid plates and separator plates, a receiving support intermittently movable in a path adjacent said stations, and means associated with each station for successively projecting one plate therefrom as the receiving support momentarily stops adjacent to a station and means associated with the receiving support for gripping and moving the projected plate onto the support.

5. A battery plate assembling machine, comprising a series of stations adapted to respectively contain stacks of grid plates and separator plates, a receiving support movable in a path adjacent the stations, means for projecting plates from the stations toward said path, and means operated from the far side of the path, with respect to the stations, for taking the plates from said projecting means and completing the movements of the plates into the receiving support when it reaches a position in said path adjacent each station.

6. A battery plate assembling machine, comprising a series of stations adapted to respectively contain stacks of grid plates and separator plates, means cooperating with each station for stripping the bottom plate from the stack and projecting such plate edgewise from the station, a series of holders movable in a path adjacent the stations, such path being substantially at right angles to the direction in which the plate is projected from the station, and means located at the other side of the path for transferring the projected plate of each station to one of the holders, the grid plate and separator plate stations being alternated so that one separator plate will be transferred to each holder between each two grid plates received by such holder.

7. A battery plate assembling machine comprising a circular series of supply stations for alternately containing respective supplies of grid plates and separator plates, a circular series of receiving stations arranged adjacent to the supply stations, means for transferring one plate from the bottom of the supply in each supply station to one of the receiving stations, and means for rotating one of said series of stations with respect to the other series, whereby grid plates and separator plates may be alternately transferred from the successive supply stations to each of the receiving stations, the stations of one of the series all being disposed in a common horizontal plane, and the stations of the other series being disposed at progressively different levels to thereby compensate for the accumulation of plates in the receiving stations.

8. In a battery plate assembling machine, a base, an annular series of plate supply stations supported by the base, a standard extending upwardly from the base, a turret rotatably supported by the standard, a series of receiving stations carried by the turret, a hub member slidably mounted on the standard, and transfer mechanisms, operated by vertical movement of said hub member, for transferring plates from the supply stations to the receiving stations.

9. In a battery plate grouping machine, a series of supply stations and a series of receiving stations arranged to successively receive plates from the supply stations, said supply stations each comprising a plate stack support and vertical guide members for guiding action with all four sides of the plate stack, and said guide members including two relatively adjustable guide elements for contact with one vertical face of the stack, whereby the supply station may be adjusted to accommodate grid plates with lugs disposed at either side of the stack, or separator plates having no lugs.

10. In a battery plate assembling machine, a plate-receiving device, means for feeding positive grid plates to said device, means for feeding negative grid plates to said device and means for feeding separator plates to said device, means for operating said feed means so that the several plates are fed edgewise in succession into said receiving device in the order in which said plates appear in a battery, means associated with said receiving device successively projectable into the path of movement of certain of said plates as they enter said device for limiting their movement and thereby offsetting them with respect to other of said plates in said device, operating means for so moving said projectable means and means for coordinating the movements of said feed operating means and said last mentioned operating means.

11. In a battery plate assembling machine, a plate-receiving device, means for feeding positive grid plates to said device, means for feeding negative grid plates to said device and means for feeding separator plates to said device, means for operating said feed means so that the several plates are fed edgewise in succession into said receiving device in the order in which said plates appear in a battery, means associated with said receiving device successively projectable into the path of movement of certain of said plates as they enter said device for limiting their movement and thereby offsetting them with respect to other of said plates in said device, operating means for so moving said projectable means and means for coordinating the movements of said feed operating means and said last mentioned operating means, said plate-receiving device including a shelf having vertical guide members at three sides to enclose the plate group to be formed, and open at its fourth side to permit edgewise movements of plates into group position on the shelf.

ARTHUR D. LUND.